United States Patent [19]

Oswitch et al.

[11] 4,079,033

[45] Mar. 14, 1978

[54] IRON AND ZINC SALTS AS SMOKE SUPPRESSANTS FOR CHLORINE-CONTAINING RESINOUS ORGANIC MATERIALS

[75] Inventors: Stanley Oswitch, Chagrin Falls; Thomas F. Barr, Parma Heights, both of Ohio

[73] Assignee: Ferro Corporation, Cleveland, Ohio

[21] Appl. No.: 614,882

[22] Filed: Sep. 19, 1975

Related U.S. Application Data

[63] Continuation-in-part of Ser. No. 378,534, Jul. 12, 1973.

[51] Int. Cl.$^2$ ................................................ C08K 5/09
[52] U.S. Cl. ...................... 260/45.75 P; 260/45.75 W; 260/45.7 RT
[58] Field of Search ................. 260/45.75 W, 45.75 P, 260/75 H, 45.7 RL

[56] References Cited

U.S. PATENT DOCUMENTS

| | | | |
|---|---|---|---|
| 2,563,772 | 8/1951 | Cheney | 260/45.75 P |
| 3,367,905 | 2/1968 | Zimberg et al. | 260/75 H |
| 3,900,441 | 8/1975 | King | 260/45.7 R |
| 3,945,974 | 3/1976 | Schwarcz et al. | 260/45.75 W |
| 3,951,894 | 4/1976 | Whelan | 260/45.75 P |

OTHER PUBLICATIONS

The Stabilization of Polyvinyl Chloride — Chevassus, (1963), pp. 173 to 175.

*Primary Examiner*—V.P. Hoke
*Attorney, Agent, or Firm*—Milton L. Simmons; Wesley B. Taylor

[57] ABSTRACT

Smoke suppressants, as distinguished from fire retardants, are disclosed for chlorine-containing resinous organic materials. The smoke suppressant comprises iron oxalate, zinc oxalate, zinc octoate, and mixtures thereof. Especially effective synergistic mixtures are a mixture of ferrous oxalate and zinc octoate and a mixture of ferrous oxalate and zinc oxalate.

16 Claims, 3 Drawing Figures

IRON AND ZINC SALTS AS SMOKE SUPPRESSANTS FOR CHLORINE-CONTAINING RESINOUS ORGANIC MATERIALS

CROSS-REFERENCE TO RELATED APPLICATION

This is a continuation-in-part of application, Ser. No. 378,534, filed July 12, 1973.

BACKGROUND OF THE INVENTION

Smoke suppressing and fire retarding are two different phenomena and have no direct interrelation. For example, fire retardants are designed to retard combustion under conditions at which combustion normally occurs; while smoke suppressants are designed to reduce the amount of smoke evolved once combustion has started.

Fire retardancy for plastics is a fairly well developed technology, but the art has previously been relatively unconcerned with smoke. Indeed, some resins or plastics can actually produce more smoke when some fire retardants are present than when they are absent. For example, in an article entitled "Method for Measuring Smoke from Burning Materials" by Gross et al, which appeared in "ASTM Special Technical Publication 422", pages 182 and 183, a glass-reinforced polyester is reported as having a maximum smoke, Dm, hereinafter defined, of 395; while a glass-reinforced polyester that contained a flame retardant had a Dm of 618. Further, in *Business Week* for Mar. 10, 1973, pages 130N and 130P, it is reported that while new FAA rules tighten limits on flammability of materials, they say nothing regarding the generation of smoke or toxic fumes. Moreover, according to the cited article, new fireretardant synthetics that have been developed to meet such rules actually smoke more than their predecessors. Copolymers of acrylonitrile-butadienestyrene are reported to produce the densest smoke of all plastics tested, while polyvinyl polymers produce the most acrid smoke, especially polyvinyl materials that have been chlorinated to improve their fire resistance.

First attempts to control the burning of plastic materials were unconcerned with the smoke problem. There is little or no existing technology of smoke suppressants applicable to organic resinous materials such as the usual synthetic plastics.

SUMMARY OF THE INVENTION

The principal object of the present invention is to provide additives for chlorine-containing resinous organic materials, such as chlorinated synthetic-plastics, which reduce the level of smoke from such materials when subjected to combustion.

It has been found that a smoke suppressant selected from the group consisting of iron oxalate, zinc oxalate, zinc octoate, and mixtures thereof achieve this and related objects. Certain mixtures are preferred and, in fact, provide synergistic effects, that is, a mixture affording greater smoke suppression than that afforded by either compound of the mixture when it is used alone. A preferred mixture of this class is one of ferrous oxalate and zinc octoate. Another synergistic mixture is one of ferrous oxalate and zinc oxalate.

The smoke suppressants may be admixed while in finely divided form with an organic resinous material by any conventional means. Any amount of a suppressant affords some benefit. The amount used usually varies from about 1 to about 30% by weight of the resinous material.

While it is not intended to restrict the invention to theory, if smoke is considered to comprise fine particles of partly burned hydrocarbon fragments broken off from a burning material, then it is postulated that the present smoke suppressants in combination with the chlorine present promote formation of a bulk char residue in preference to formation of a finely divided effluent char that is visually observed as smoke. There may well be a carbon-to-carbon linkage in the char retained by the organic resinous material under the influence of the present additives. Moreover, the char so formed tends thermally to insulate the remaining material and in this manner aids in reducing or eliminating its flaming and combustion. Accordingly, use of the present smoke suppressants can also be a technique for at least slowing combustion.

DESCRIPTION OF THE PREFERRED EMBODIMENTS

In resume, compounds of iron oxalate, zinc oxalate, zinc octoate and mixtures thereof are incorporated in chlorine-containing resinous organic materials to reduce smoke generated by the material during combustion by promoting formation of a bulk char residue in coaction with the chlorine in preference to formation of a finely divided effluent char which takes the form of smoke.

Figure 2:
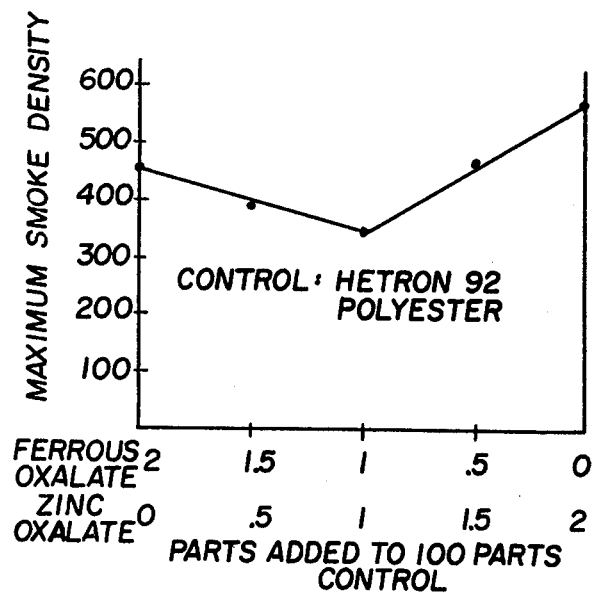
FIG. 2 is a graph of the effect of a mixture of ferrous oxalate and zinc octoate as a smoke suppressant on Hetron 92 polyester and shows the synergistic effect of such a mixture.
Figure 3:
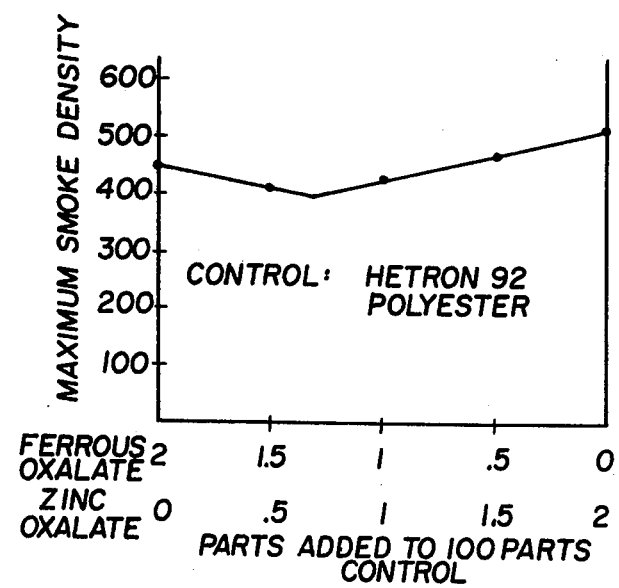
FIG. 3 is a graph of the effect of a mixture of ferrous oxalate and zinc oxalate as a smoke suppressant on Hetron 92 polyester and shows the synergistic effect of such a mixture.

Certain mixtures of the indicated compounds have been found to have synergistic effects in that the mixtures afford greater smoke suppression than that afforded by either compound when used alone. One mixture comprises ferrous oxalate and zinc octoate, the effects of which on maximum smoke density are illustrated by the graph of FIG. 2, as hereinafter described. Another synergistic mixture comprises ferrous oxalate and zinc oxalate, the effects of which on maximum smoke density are illustrated by the graph of FIG. 3.

As used here and in the claims, the term "resinous organic material" is taken to mean a wide variety of diverse organic materials which are combustible. Examples include natural resins but more often the usual synthetic resin plastics, such as thermoplastic resins like polyester resins, polyvinyl resins like polyvinyl chloride, polyvinyl acetate, and polyvinyl butyral, polyacrylic resins like polyacrylic acid, polyacrylic esters, polymethacrylic acid, and polymethacrylic esters, terpolymers of acrylonitrile-butadiene-stryene, polyethylene, polypropylene, polystyrene, nylon, polyurethane, polytetrafluorethylene, and the like; and thermosetting resins like phenol formaldehyde, urea formaldehyde, epoxy resins, melamine formaldehyde, phenol furfuryl, cross-linked polyester resins, and the like.

As used here and in the claims, the term "chlorine-containing" or forms thereof are taken to mean that the resinous organic material contains chlorine in its chemical make-up such as in polyvinyl chloride; or contains chlorine as from mechanical admixture with a compound which contains chlorine, such as a plasticizer or other compound mixed with the resinous organic material to vary its properties.

The identified iron or zinc compounds or mixtures thereof may be incorporated directly into a resinous organic material by any standard means. The compounds are finely divided, for example from 100 to about 500 mesh, U.S. Standard sieve, and added to the resinous materials much like a filler. In the case of thermosetting materials, the iron or zinc compounds are added to the monomeric or prepolymer molding or casting mixture. In the case of thermoplastic materials, the latter can first be reduced to a hot melt and the smoke suppressant compounds then uniformly mixed with the hot melt. Any amount of an identified iron or zinc compound provides some beneficial effect. The amount used may range from about 1 to about 30% by weight of the organic material, although amounts of about 5 to about 15% are more usually employed.

The action of the present smoke suppressants in a matrix of the described resinous organic material during its combustion is thought to be quite complex. In some manner an appreciable amount of the carbon produced by combustion is retained in situ. In view of the relatively small amount of an iron or zinc compound that can be effective, the phenomenon may be a catalytic action rather than a basic chemical reaction in which the iron or zinc is a reactant. The presence of chlorine is also regarded as important. The metal may catalyze a carbon-to-carbon linkage, resulting in a build-up of char sufficiently massive to avoid effluent flight. It is also possible that a chemical ring formation is encouraged by the iron or zinc compounds which is more apt to be converted to char than alicylic compounds. The char so produced acts as an ablative barrier and aids in reducing the formation of soot. Especially the iron compounds are apt to enhance swelling of the char which reduces smoke and thermally insulates the remaining resinous material.

The following examples are intended only to illustrate the invention and should not be construed to impose limitations on the claims. Parts are by weight. In the tests hereinafter described, the test specimens were subjected to forced combustion not only to standardize conditions of test but also to overcome any flame retardancy that might be present in the test specimen and to establish whether or not the test specimen actually emitted smoke upon combustion. In particular, an Aminco-NBS Smoke Density Chamber was used for testing and evaluation of the test specimens. This test method was developed by the Fire Test Group of the National Bureau of Standards, as described in ASTM Special Technical Publication, No. 422.

The test chamber consisted of a sealed box having a volume of 18 cubic feet and a vertical light path three feet long. A specimen was exposed in the chamber to flames from gas jets, and the resulting smoke from the test specimen inherently obscured to some extent the vertical beam of light. The change in intensity of the light beam was noted by a photomultiplier tube and converted electronically to percentage transmittance. The photometer output can be monitored by a recorder which gives a plot of percentage transmittance versus time.

The test result most often quoted is the Maximum Specific Optical Density, Dm. The lower the Dm, the better is the smoke suppression. Percent transmittance, T, is converted to Specific Optical Density, Ds, by the following equation derived from Bouguer's law:

$$Ds = G[\log_{10}(100/T)]$$

where G is a constant geometrical factor, equal to the volume of the chamber divided by the light path length times the area of the specimen, in this case equal to 132. Other quantities reported are:

Dc — Correction for soot deposits on optical windows, it is subtracted from Dm before reporting.

Tm — Time to reach maximum density (Dm), higher times indicate better smoke suppression.

Tcrit - Time in minutes to reach a critical density of 75%T (or Ds = 16).

Dm — Ds maximum, that is, maximum smoke density.

As a further control and standardization of the tests, the organic resinous material used was a leading fire retardant, namely, a cross-linked, polyester resin sold by Hooker-Durez under the trademark "Hetron 92". This resin smokes heavily under forced combustion and is a chlorinated, unsaturated polyester resin having about 50% by weight chlorine. The liquid prepolymer consists essentially of the reaction product of hexachloroendomethylene tetrahydrophthalic anhydride, maleic anhydride and propylene glycol. The prepolymer reaction product becomes a solid polyester when dissolved in 30% by weight of styrene and cured to a cross-linked form.

Test castings were made of this polyester resin either alone or with a present smoke suppressant measuring 3 inches square and ⅛ inch thick. The specimens were cured at room temperature using methyl ethyl ketone peroxide and cobalt naphthanate, followed by a post cure at 85° C for three hours. When used alone, Hetron 92 polyester is particularly smoky and exceeded the limit of the optics of the Smoke Density Chamber under the described flaming conditions; note FIG. 1. A test specimen of Hetron 92 polyester having the measurements previously indicated, weighing about 24 grams, and containing none of the present smoke suppressants reached the limit of the photocell (950 Ds) in about 2 minutes. Further specimens of Hetron 92 polyester weighing about 12 grams and still free of any of the present smoke suppressants had a maximum smoke density (Dm) of 670 which, when extrapolated on a per weight basis for 24 grams, would yield a Dm of 1350. Hetron 92 polyester alone burns with a full 6 to 8 inch flame producing a very sooty, black smoke.

EXAMPLES 1 and 2

Iron oxalate was quite effective in reducing smoke from Hetron 92 polyester. In one specific test, Hetron 92 polyester containing 1% ferrous oxalate yielded under the described test a maximum density, Dm, of 452, required 5.5 minutes to reach Dm and burned with a thin 6 inch flame leaving very little or no soot deposited in the chamber. That the iron oxalate caused slower burning is evidenced by the longer times required to reach Dm. Table A provides comparative values of this test for Hetron polyester alone and with 1% by weight of ferrous oxalate.

TABLE A

| | Max. Density Dm | Time to Dm (Min.) Tm | Residue Dc | Tcrit (Min.) TDs = 16 |
|---|---|---|---|---|
| Polyester (Hetron 92) Control | 950+ | 2.0 | 51.1 | 0.48 |
| Polyester plus 1% Fe Oxalate | 452 | 5.5 | 15 | 0.5 |

EXAMPLES 3 THROUGH 10

A series of test specimens containing Hetron 92 polyester and ferrous oxalate was tested and showed a reduction of smoke, $Dm$, with increasing amounts of the oxalate. Smoke dropped quickly with 0.5 and 1% additions of the ferrous oxalate, after which the amount of smoke decreased gradually up to 15 parts of the smoke suppressant for 100 parts of polyester resin.

Table B lists other test results. The term "PPH" means parts of additive per 100 parts of polyester resins. The specimens of Examples 3, 4 and 5 were of the polyester alone as a control and weighed 24 grams, 12 grams, and 10 grams, respectively. The specimens of the other examples weighed about 24 grams.

TABLE B

| Example | Additive | PPH | Dm | Tm |
|---|---|---|---|---|
| 3 | (Polyester alone) | — | 950+ | 2.0 |
| 4 | (Polyester alone) | — | 670 | 1.8 |
| 5 | (Polyester alone) | — | 590 | 3.2 |
| 6 | Ferrous oxalate | 0.5 | 580 | 4 |
| 7 | Ferrous oxalate | 1.0 | 450 | 5 |
| 8 | Ferrous oxalate | 2.0 | 450 | 6 |
| 9 | Ferrous oxalate | 5.0 | 410 | 5.5 |
| 10 | Ferrous oxalate | 15.0 | 345 | 5 |

EXAMPLES 11 THROUGH 17

Zinc oxalate and zinc octoate are also quite effective for reducing smoke generated during combustion of resinous organic materials. These zinc compounds have the advantage of being white compared to the colorful iron salts. Zinc octoate (zinc 2-ethyl-hexanoate) has the added advantage of being completely resin soluble and colorless. Table C lists tests results on these zinc compounds which were obtained in the same manner previously described for the iron oxalate.

TABLE C

| Example | Additive | PPH | Dm | Tm |
|---|---|---|---|---|
| 11 | Zinc oxalate | 2 | 510 | 5 |
| 12 | Zinc oxalate | 5 | 500 | 5 |
| 13 | Zinc octoate | 10 | 512 | 7 |
| 14 | Zinc octoate | 2.5 | 570 | 5 |
| 15 | Zinc oxalate | 5 | 460 | 5.3 |
| 16 | Zinc oxalate | 1 | 830 | 4 |
| 17 | Zinc octoate | 5 | 540 | 6.5 |

EXAMPLE 18

The effectiveness of ferrous oxalate in flexible polyvinyl chloride was also evidenced by the Smoke Density Chamber. Two parts of ferrous oxalate in 100 parts of flexible polyvinyl chloride and 22.5 parts of each of dioctyl phthalate and tricresyl phosphate provided a smoke reduction of 32% as compared to the same polyvinyl chloride without the ferrous oxalate. The flexible polyvinyl chloride containing the dioctyl phthalate as a plasticizer had a Dm of 525 and a Tm of 3 minutes.

EXAMPLE 19

In another test run, a resinous organic material consisting of 100 partss of polyvinyl chloride and 2 parts of ferrous oxalate had a Dm of 236 and Tm of 4.5.

EXAMPLE 20

In a further test run, a resinous organic material consisting of 100 parts of acrylonitrile butadiene styrene and 10 parts of ferrous oxalate had Dm of 470 and a Tm of 2.1.

EXAMPLES 21 THROUGH 28

To illustrate the superiority of the foregoing iron and zinc compounds over other metal additives, the same tests were run on Hetron 92 polyester containing different amounts of several metal compounds. Table D lists the test results.

TABLE D

| Example | Additive | PPH | Dm | Tm |
|---|---|---|---|---|
| 21 | CaO | 10 | 925 | 2.0 |
| 22 | BaO | 10 | 950 | 2.6 |
| 23 | TiO$_2$ | 5 | 925 | 2.6 |
| 24 | La$_2$O$_3$ | 5 | 950 | 2.5 |
| 25 | Ga$_2$O$_3$ | 5 | 640 | 6.0 |
| 26 | RuO$_2$ | 5 | 909 | 2.8 |
| 27 | Talc | 15 | 800 | 3.5 |
| 28 | Sodium antimonate | 5 | 950 | 2.6 |

EXAMPLES 29 THROUGH 42

The following examples are directed to the use of mixtures of ferrous oxalate and zinc octoate and mixtures of ferrous oxalate and zinc oxalate. The test results shown in Table E were obtained in the same manner as previously described. In the table, the number preceeding the stated compound represents the number of parts used of that compound per 100 parts of the control, Hetron 92 chlorinated polyester.

TABLE E

| | Iron and Zinc Mixtures | | |
|---|---|---|---|
| Example | Additive Mixture | Dm | Tm |
| 29 | 0.25 Zinc octoate & 0.25 Ferrous oxalate | 630 | 4 |
| 30 | 0.5 Zinc octoate & 0.5 Ferrous oxalate | 420 | 7 |
| 31 | 1 Zinc octoate & 1 Ferrous oxalate | 345 | 5.5 |
| 32 | 1.5 Zinc octoate & 1.5 Ferrous oxalate | 405 | 6 |
| 33 | 2.5 Zinc octoate & 2.5 Ferrous oxalate | 445 | 5 |
| 34 | 5 Zinc octoate & 5 Ferrous oxalate | 500 | 6.5 |
| 35 | 1 Zinc octoate + 2 Ferrous oxalate | 400 | 8 |
| 36 | 2 Zinc octoate + 1 Ferrous oxalate | 480 | 5 |
| 37 | 1.5 Zinc octoate + 0.5 Ferrous oxalate | 470 | 4.5 |
| 38 | 0.5 Zinc octoate + 1.5 Ferrous oxalate | 390 | 8 |
| 39 | 1 Zinc oxalate + 1 Ferrous oxalate | 425 | 6 |
| 40 | 0.5 Zinc oxalate + 1.5 Ferrous oxalate | 410 | 5.5 |
| 41 | 1.5 Zinc oxalate + 0.5 Ferrous oxalate | 470 | 4.5 |
| 42 | 2.5 Zinc oxalate + 2.5 Ferrous oxalate | 450 | 7 |

Figure 1:
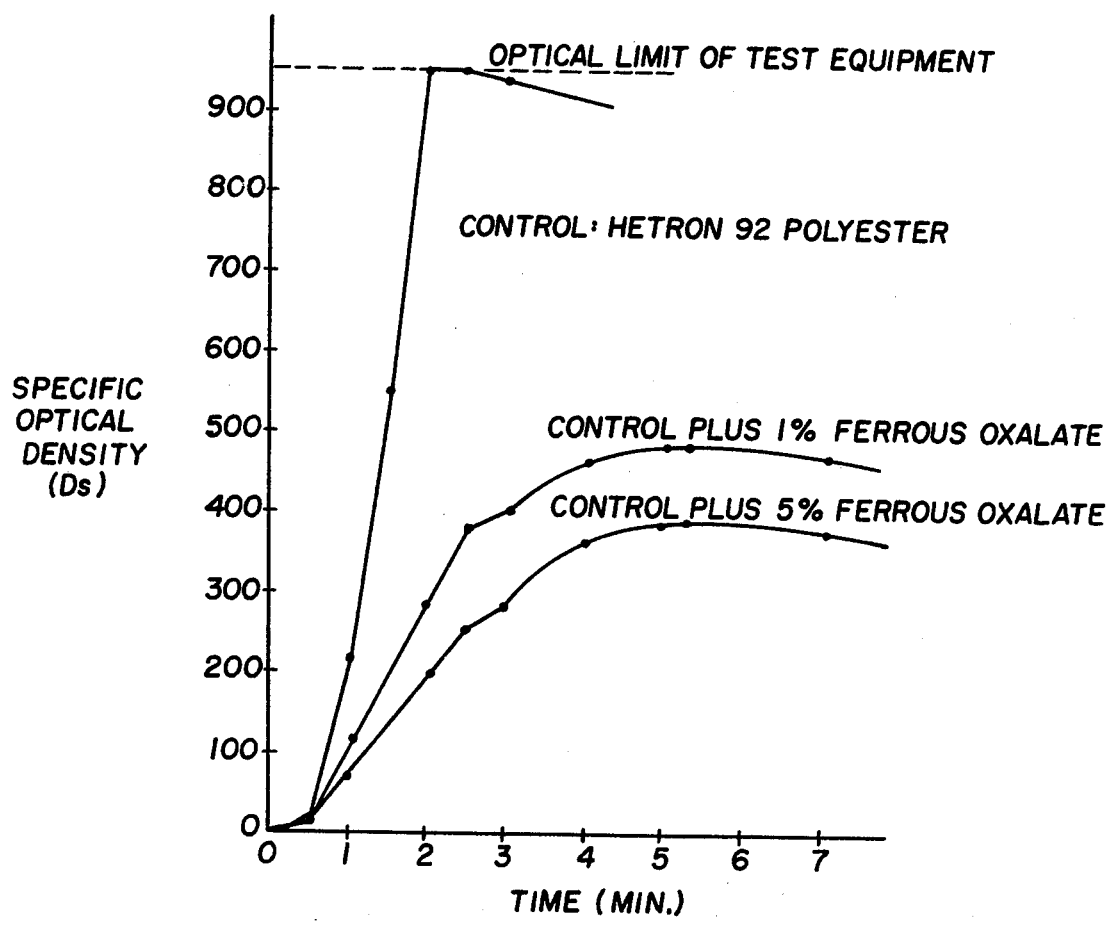
FIG. 1 is a graph of smoke development as expressed in specific optical density, $D_s$, of the smoke versus time for a control resin consisting of a chlorinated polyester (Hetron 92 as hereinafter defined), and the same polyester resin with 1% and 5%, respectively, levels of ferrous oxalate.

Referring to the figures, FIG. 1 illustrates the marked reduction in specific optical density, Ds, contributed by an addition of even 1% by weight of ferrous oxalate to the control, Hetron 92 chlorinated polyester resin. An addition of 5% of ferrous oxalate affords an even greater reduction in smoke generated, as illustrated.

FIGS. 2 and 3 show the synergism, respectively, of mixtures of ferrous oxalate and zinc octoate and mixtures of ferrous oxalate and zinc oxalate. As the figures indicate, the addition of one compound to the other in even extremely minute amounts affords an improvement over that obtained by the use of either compound alone. A range of from about 0.25 part to about 1.75 parts of ferrous oxalate and from about 0.25 part to about 1.75 parts of zinc octoate, all by weight, is preferred. The optimum mixture is about equal parts of each compound.

With the ferrous oxalate and zinc oxalate mixture, a range of from about 0.25 part to about 1.75 parts of ferrous oxalate and from about 0.25 part to about 1.75 parts of zinc oxalate, all by weight, is also preferred. The optimum mixture of these compounds is about 1.4 parts of ferrous oxalate and 0.6 part of zinc oxalate.

In general, iron and zinc compounds of the present invention have reduced maximum smoke densities of resinous organic materials undergoing forced combustion by as much as 20 to 70% with additions of about only 1 to about 5% by weight of such compounds. It has also been noted during collection of the data presented herein that, after burning of the test resinous organic material, a resin residue had an intact foamed char. This rigid char has been found to be unique with respect to resinous organic materials containing iron or zinc additives of the present invention.

While ferrous oxalate has been used in the foregoing tests and data, it is understood that this represents the preferred form of iron oxalate that may be used and that ferric oxalate is also operative and contemplated by the present invention.

Although the foregoing describes several embodiments of the present invention, it is understood that the invention may be practiced in still other forms within the scope of the following claims.

We claim:

1. A resinous chlorine-containing organic material and a metal compound mixture adapted to operate in conjunction with said chlorine during combustion of the organic material as a smoke suppressant, said metal compound mixture being incorporated in said material and selected from the group consisting of a mixture of iron oxalate and zinc octoate and a mixture of iron oxalate and zinc oxalate, said metal compound mixture being present in sufficient amount to reduce the level of smoke from said organic material during its combustion by action of said compound with said chlorine to retain in situ an appreciable amount of carbon produced by said combustion and thereby promote formation of a bulk char residue in preference to formation of a finely divided effluent smoke.

2. The resinous organic material of claim 1 in which said material is chlorinated.

3. The resinous organic material of claim 1 in which said material is a chlorinated polyester resin.

4. The resinous organic material of claim 1 in which said metal compound mixture is present in an amount of about 1 to about 30% by weight of said material.

5. The resinous organic material of claim 1 in which said metal compound mixture consists essentially by weight of from about 0.25 part to about 1.75 parts of ferrous oxalate and from about 0.25 part to about 1.75 parts of zinc octoate.

6. The resinous organic material of claim 1 in which said metal compound mixture consists essentially by weight of from about 0.25 part to about 1.75 parts of ferrous oxalate and from about 0.25 part to about 1.75 parts of zinc oxalate.

7. The resinous organic material of claim 1 in which said material is polyvinyl chloride.

8. The resinous organic material of claim 1 in which said material is a resin selected from the group consisting of polyester resins, polyvinyl resins, polyacrylic resins, acrylonitrile-butadiene-styrene polymers, polyethylene, polypropylene, polystyrene, nylon, polyurethane, polytetrafluorethylene, phenol formaldehyde, urea formaldehyde, epoxy resins, melamine formaldehyde, and phenol furfuryl.

9. A process for suppressing the smoke generated by chlorine-containing resinous organic material during combustion thereof comprising incorporating in said material a smoke suppressant selected from the group consisting of a mixture of iron oxalate and zinc octoate and a mixture of iron oxalate and zinc oxalate, said smoke suppressant being present in an amount sufficient to effect said suppression and serving to reduce the level of smoke during combustion of said organic material by the action of at least one of said mixtures in the presence of said chlorine to retain in situ an appreciable amount of carbon produced by said combustion and thereby promote formation of bulk char residue from the combustion of said material in preference to formation of a finely divided effluent smoke.

10. The process of claim 9 in which said material is chlorinated.

11. The process of claim 9 in which said smoke suppressant is present in an amount of about 1 to about 30% by weight of said material.

12. The process of claim 9 in which said smoke supressant consists essentially by weight of from about 0.25 part to about 1.75 parts of ferrous oxalate and from about 0.25 part to about 1.75 parts of zinc octoate.

13. The process of claim 9 in which said smoke suppressant consists essentially by weight of from about 0.25 part to about 1.75 parts of ferrous oxalate and from about 0.25 part to about 1.75 parts of zinc oxalate.

14. The process of 9 in which said material is a chlorinated polyester resin.

15. The process of claim 9 in which said material is polyvinyl chloride.

16. The process of claim 9 in which said material is a resin selected from the group consisting of polyester resins, polyvinyl resins, polyacrylic resins, acrylonitrile-butadiene-styrene polymers, polyethylene, polypropylene, polystyrene, nylon, polyurethane, polytetrafluorethylene, phenol formaldehyde, urea formaldehyde, epoxy resins, melamine formaldehyde, and phenol furfuryl.

* * * * *